March 10, 1964

L. D. KLEISS ETAL 3,124,148

FLUID BLENDING SYSTEM

Filed Sept. 8, 1958

INVENTORS
L. D. KLEISS
J. R. CONNELL

BY *Hudson & Young*

ATTORNEYS

United States Patent Office 3,124,148
Patented Mar. 10, 1964

3,124,148
FLUID BLENDING SYSTEM
Louis D. Kleiss and John R. Connell, Borger, Tex., assignors to Phillips Petroleum Company, a corporation of Delaware
Filed Sept. 8, 1958, Ser. No. 759,699
5 Claims. (Cl. 137—93)

This invention relates to the blending of fluid streams to provide fluid mixtures of predetermined compositions.

In various industrial operations, two or more fluid streams are blended to provide a fluid mixture. One specific example of such a system occurs in the production of synthetic rubber by the copolymerization of monomers such as butadiene and styrene. The butadiene and styrene can advantageously be blended to form a mixture of predetermined composition which is directed to the polymerization reactors. Obviously, it is important that these two monomers be blended in a predetermined ratio in order that the resulting latex shall have the desired properties. It is common practice to analyze samples of the latex particles to determine the bound styrene content. Suitable adjustments are then made, as necessary, of the rates at which the monomers are charged to the reactor in order to maintain the bound styrene content at a desired value. However, this control system has not been entirely satisfactory because of the rather lengthy time lag through the polymerization process. Considerable amounts of off-specification material have been produced in the past due to the fact that the monomers were not charged to the reactor at the proper rates.

In accordance with the present invention, there is provided a control system for fluid blending operations which maintains the composition of the blended stream at a predetermined constant value. This is accomplished by measuring continuously a property of the blend stream, such as the refractive index, and controlling the ratio of the streams blended in response to this analysis. In one specific embodiment, one of the streams to be blended is provided with a flow controller so that this stream is supplied at a constant rate. A ratio controller responsive to the flow controller adjusts the flow of the second stream through a second flow controller to maintain a predetermined ratio between the flows of the two streams. The analyzer operates to reset the ratio controller as may be necessary to maintain the composition of the blended stream constant at a predetermined value.

Accordingly, it is an object of this invention to provide apparatus for use in blending a plurality of fluid streams to produce a fluid mixture of predetermined composition.

A further object is to provide a control system to blend fluid streams of butadiene and styrene to be supplied to a polymerization reactor.

Other objects, advantages and features of the invention should become apparent from the following detailed description which is taken in conjunction with the accompanying drawing in which.

Figure 1:
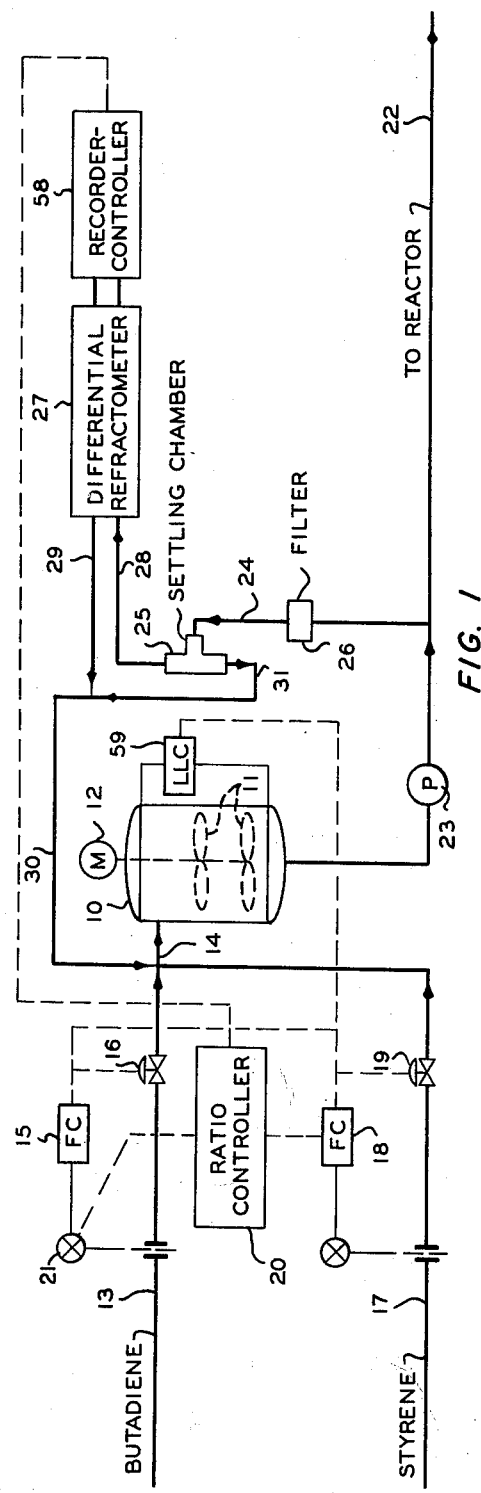
FIGURE 1 is a schematic representation of an embodiment of the fluid blending system of this invention.

Referring now to the drawing in detail and to FIGURE 1 in particular, there is shown a storage vessel 10 which is provided with stirrers 11 that are rotated by a motor 12. Butadiene is introduced into vessel 10 through series connected conduits 13 and 14. The flow through conduit 13 is maintained at a constant value by means of a flow controller 15 which regulates a valve 16. Styrene is introduced into vessel 10 through series connected conduits 17 and 14. A flow controller 18 adjusts a valve 19 in conduit 17 to tend to maintain a predetermined flow rate through conduit 17. The set point of controller 18 is adjusted by a ratio controller 20 which is actuated by the flow transmitter 21 associated with flow controller 15. In this manner, the flow through conduit 17 is maintained at a predetermined rate with respect to flow through conduit 13. This control system thus delivers the two monomer streams to vessel 10 in a predetermined ratio. The fluid mixture in vessel 10 is subsequently removed through a conduit 22, which has a pump 23 therein, and is directed to the polymerization reactors, not shown.

If the compositions of the monomer streams should change, the ratio of butadiene to styrene in the fluid mixture can vary. The composition of the butadiene stream is quite likely to vary in a commercial operation because substantial amounts of unreacted butadiene from the polymerization reactors are blended with fresh butadiene to constitute the fluid stream introduced into the system through conduit 13. Any change in the concentration of butadiene in this stream obviously changes the ratio of butadiene to styrene in the blended fluid mixture supplied to the reactors. In accordance with the present invention, the composition of the blended stream in conduit 22 is measured continuously and ratio controller 20 is reset, as required, to maintain the composition of the blended stream at a predetermined value. A sample of the fluid mixture in conduit 22 is removed through a conduit 24 which communicates with a settling chamber 25. A filter 26 is disposed in conduit 24 to remove water, styrene gel and any other semitransparent materials which may be suspended in the fluid blend. This filter is important because semitransparent particles tend to adhere unevenly to the transparent interfaces of the sample cell. A beam of light passing through an uneven, semitransparent interface is scattered rather than refracted. A cell fouled in this manner will give a false indication of refractive index. Polytetrafluoroethylene felt is a filter material which has proved to be effective for this purpose. Several conventional filter materials have failed to remove the foreign materials or have become fouled in a short time. A portion of the sample stream is removed from the top of chamber 25 and directed to the inlet of a differential refractometer 27 through a conduit 28. This sample stream is subsequently returned to vessel 10 through series connected conduits 29, 30 and 14. The remainder of the fluid sample is removed from the bottom of settling chamber 25 and is returned to vessel 10 through conduits 31, 30 and 14.

Figure 2:
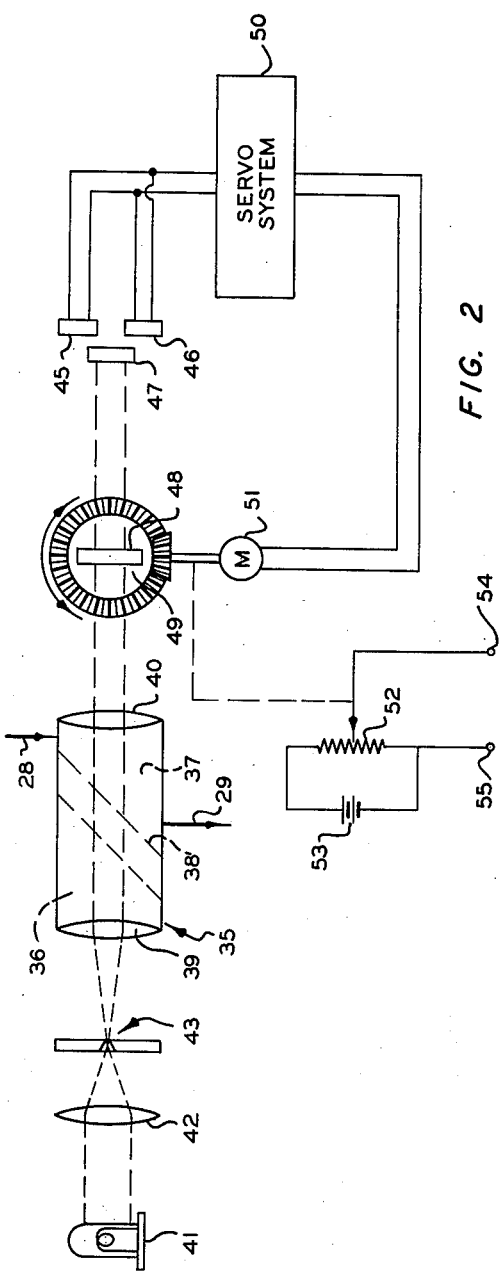
FIGURE 2 is a schematic representation of a differential refractometer which can be employed in the control system of FIGURE 1.

A suitable differential refractometer for use in the blending system of this invention is illustrated schematically in FIGURE 2. This refractometer includes a cell assembly 35 which comprises adjacent fluid containing chambers 36 and 37 that are separated by a diagonal plate 38 of radiation transparent material. The ends of the cell assembly comprise respective lenses 39 and 40. Radiation from a source 41 is directed by a lens 42 through an aperture 43 and through cell assembly 35. The radiation beam emerging from the cell assembly is focused by lens 40 on a detector assembly which comprises adjacent photocells 45 and 46 that have an opaque barrier 47 therebetween. A block of radiation transparent material 48 is mounted on a support 49 so that it can be rotated in the radiation beam.

Chamber 36 is filled with a reference liquid, such as benzene. The sample stream to be analyzed is introduced into chamber 37 through conduit 28 and is removed through conduit 29. If the refractive index of the test fluid is the same as the refractive index of the reference fluid, the light beam emerges from the cell assembly in a direction parallel to the incoming beam. If the refractive index of the sample fluid should differ from the refractive index of the reference fluid, the light beam is displaced in one direction or the other. The apparatus is adjusted initially so that the emerging light beam impinges equally on photocells 45 and 46 when the refractive index of the test fluid has a predetermined value. This can be accomplished by manually rotating block 48 or by displacing the cell assembly from its longitudinal axis a slight amount. The two photocells are connected in opposition to one another and to the input of a servo system 50. The output signal of the servo system actuates a reversible motor 51, the drive shaft of which is connected to base 49 so as to rotate block 48. If the refractive index of the test fluid should increase, for example, the beam emerging from the cell assembly is refracted in a first direction. This results in a greater amount of light impinging upon one of the photocells than on the other so that an input signal is applied to the servo system. This signal drives motor 51 to rotate block 48 to refract the beam in the opposite direction until photocells 45 and 46 again receive equal amounts of radiation. The rotation of the drive shaft of motor 51 is thus representative of changes in refractive index of the test fluid.

The drive shaft of motor 51 is also mechanically connected to the contactor of a telemetering potentiometer 52. A voltage source 53 is connected across the end terminals of potentiometer 52. The contactor and one end terminal of the potentiometer are connected to respective output terminals 54 and 55. It should thus be evident that the voltage between these terminals is representative of the position of the drive shaft of motor 51. This voltage constitutes the output signal of the refractometer and is representative of the refractive index of the test fluid.

Referring again to FIGURE 1, the output signal of refractometer 27 is applied to a conventional recorder-controller 58. This controller provides an output signal which functions to reset ratio controller 20. The refractive index of butadiene is approximately 1.422 and the refractive index of styrene is approximately 1.547, whereas the resulting mixture which is removed through conduit 22 has a refractive index intermediate these values. The control system is adapted to maintain a blend having a preselected refractive index intermediate these values. If the measured refractive index should increase above this desired value, the amount of styrene supplied to the system should be reduced with respect to the amount of butadiene. The output signal from controller 58 thus adjusts controller 20 to reduce the flow through conduit 17. Conversely, if the measured refractive index falls below the desired value, controller 20 is reset to increase the flow through conduit 17.

A liquid level controller 59 is connected to vessel 10 so as to detect a level near the top of the vessel. If the fluid mixture in vessel 10 should rise to this level, controller 59 provides an output signal which overrides the flow controllers to close valves 16 and 19. These valves remain closed until the level in vessel 10 falls below the set point of the liquid level controller. This provides a safety factor to prevent the monomers from being supplied to the mixing vessel at a combined rate greater than the withdrawal rate.

While the invention has been described in conjunction with the blending of butadienes and styrene in a synthetic rubber polymerization process, it should be evident that other types of fluid streams can also be blended in the same fashion. Thus, while the invention has been described in conjunction with a present preferred embodiment, it obviously is not limited thereto.

What is claimed is:

1. Fluid blending apparatus comprising a mixing chamber, first conduit means communicating with said chamber to introduce a first fluid, second conduit means communicating with said chamber to introduce a second fluid, third conduit means communicating with said chamber to remove blended fluid therefrom, first flow control means associated with said first conduit means to maintain flow therethrough at a predetermined rate, ratio controller means responsive to said first flow control means to maintain the flow through said second conduit means at a predetermined ratio with respect to the flow rate through said first conduit means, a refractometer to measure the refractive index of a sample fluid directed thereto, a settling chamber having an inlet intermediate its ends and outlets at the upper and lower ends, fourth conduit means communicating between said third conduit means and the inlet of said settling chamber, a filter in said fourth conduit means, fifth conduit means communicating between the upper outlet of said settling chamber and said refractometer to pass a sample to said refractometer, sixth conduit means communicating with the lower outlet of said settling chamber and the inlet of said mixing chamber, and control means responsive to said refractometer to reset said ratio controller means to change said predetermined ratio so as to maintain the refractive index of fluid in said third conduit means at a predetermined value.

2. The apparatus of claim 1 wherein said filter comprises polytetrafluorethylene felt.

3. Fluid blending apparatus comprising a mixing chamber, first conduit means communicating with said chamber to introduce a first fluid, second conduit means communicating with said chamber to introduce a second fluid, third conduit means communicating with said chamber to remove blended fluid therefrom, first flow control means associated with said first conduit means to maintain flow therethrough at a predetermined rate, ratio controller means responsive to said first flow control means to maintain the flow through said second conduit means at a predetermined ratio with respect to the flow rate through said first conduit means, a refractometer cell comprising two adjacent chambers separated by a plate of radiation transparent material, one of said chambers being adapted to contain a reference fluid, means to circulate fluid from said third conduit means through the other of said chambers, means to direct a beam of radiation through said chambers, means to measure the deviation of said beam, and means responsive to said means to measure to reset said ratio controller means to change said predetermined ratio so as to maintain the refractive index of fluid in said third conduit means at a predetermined value.

4. The apparatus of claim 3 wherein said one chamber is filled with benzene.

5. The apparatus of claim 3 further comprising liquid level sensing means communicating with an upper region of said mixing chamber, and means responsive to said liquid level sensing means to terminate fluid flow through said first and second conduit means when liquid in said mixing chamber rises to said upper region.

References Cited in the file of this patent

UNITED STATES PATENTS

| | | |
|---|---|---|
| 2,072,384 | Schmidt | Mar. 2, 1937 |
| 2,262,573 | Bender | Nov. 11, 1941 |
| 2,263,055 | Smith | Nov. 18, 1941 |
| 2,379,240 | Lobdell | June 26, 1945 |
| 2,483,102 | Pierson | Sept. 27, 1949 |
| 2,764,178 | Paul | Sept. 25, 1956 |
| 2,817,691 | Hutchins | Dec. 24, 1957 |
| 2,835,715 | Tiede | May 20, 1958 |
| 2,868,216 | Robertson | Jan. 13, 1959 |
| 2,881,235 | Van Pool | Apr. 7, 1959 |
| 2,883,343 | Favre | Apr. 21, 1959 |